United States Patent
Peng et al.

(10) Patent No.: US 8,602,677 B2
(45) Date of Patent: Dec. 10, 2013

(54) MOUNTING APPARATUS FOR EXPANSION CARD

(75) Inventors: Wen-Tang Peng, New Taipei (TW); Guang-Yi Zhang, Shenzhen (CN); Xiao-Zheng Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 194 days.

(21) Appl. No.: 13/223,247

(22) Filed: Aug. 31, 2011

(65) Prior Publication Data

US 2012/0282021 A1 Nov. 8, 2012

(30) Foreign Application Priority Data

May 6, 2011 (CN) .............................. 201110116763

(51) Int. Cl.
*H05K 7/12* (2006.01)
(52) U.S. Cl.
USPC ......................................... 403/329; 361/801
(58) Field of Classification Search
USPC ........... 403/326, 329; 361/801; 439/327, 328, 439/59, 60, 61, 62
See application file for complete search history.

(56) References Cited

U.S. PATENT DOCUMENTS

| | | | | |
|---|---|---|---|---|
| 3,652,899 A | * | 3/1972 | Henschen | 361/796 |
| 4,589,794 A | * | 5/1986 | Sugiura et al. | 403/187 |
| 5,383,793 A | * | 1/1995 | Hsu et al. | 439/327 |
| 5,423,691 A | * | 6/1995 | Pickles | 439/327 |
| 6,064,574 A | * | 5/2000 | Yu et al. | 361/704 |
| 6,960,093 B1 | * | 11/2005 | Fan | 439/62 |
| 7,866,995 B1 | * | 1/2011 | Kudo | 439/327 |
| 8,422,242 B2 | * | 4/2013 | Lin | 439/327 |
| 2012/0147581 A1 | * | 6/2012 | Zhou et al. | 361/801 |

* cited by examiner

*Primary Examiner* — Michael P Ferguson
(74) *Attorney, Agent, or Firm* — Altis Law Group, Inc.

(57) ABSTRACT

A mounting apparatus for latching two expansion cards to two expansion slots includes four fixing portions extending up from opposite ends of the expansion slots, four locking members rotatably mounted to the fixing portions for clamping two opposite ends of the expansion cards, and two latching members. Each latching member includes a connecting plate, two latching portions extending up from the connecting plate to latch tops of the corresponding expansion cards, and two resilient hooks extending down from the connecting plate to latch the locking members at the same end of the expansion slots.

8 Claims, 5 Drawing Sheets

MOUNTING APPARATUS FOR EXPANSION CARD

CROSS-REFERENCE OF RELATED APPLICATION

Relevant subject matter is disclosed in two pending U.S. patent applications, both titled "MOUNTING APPARATUS FOR EXPANSION CARD", with the application Ser. Nos. 13/217,263 and 13/220,705, respectively, filed on Aug. 25, 2011, and Aug. 30, 2011, which are assigned to the same assignee as this patent application.

BACKGROUND

1. Technical Field

The present disclosure relates to mounting apparatuses, and particularly, to an apparatus for mounting an expansion card.

2. Description of Related Art

Many expansion cards, such as a memory card, are usually fixed on a circuit board of an electronic device, such as a computer or a server, by a mounting apparatus. The mounting apparatus includes an expansion slot to electrically connect the expansion card, and two locking members disposed at two opposite ends of the expansion slot for clamping two opposite ends of the expansion card. However, the expansion slot can only mount one type of expansion card, such as memory cards. For an expansion card of a different type, such as a solid state disk card, which is physically larger than the expansion cards, when the solid state disk card is inserted into the expansion slot, the locking members can only clamp lower portions of two opposite ends of the card. Thus, the solid state disk card cannot be securely fixed through the locking members.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
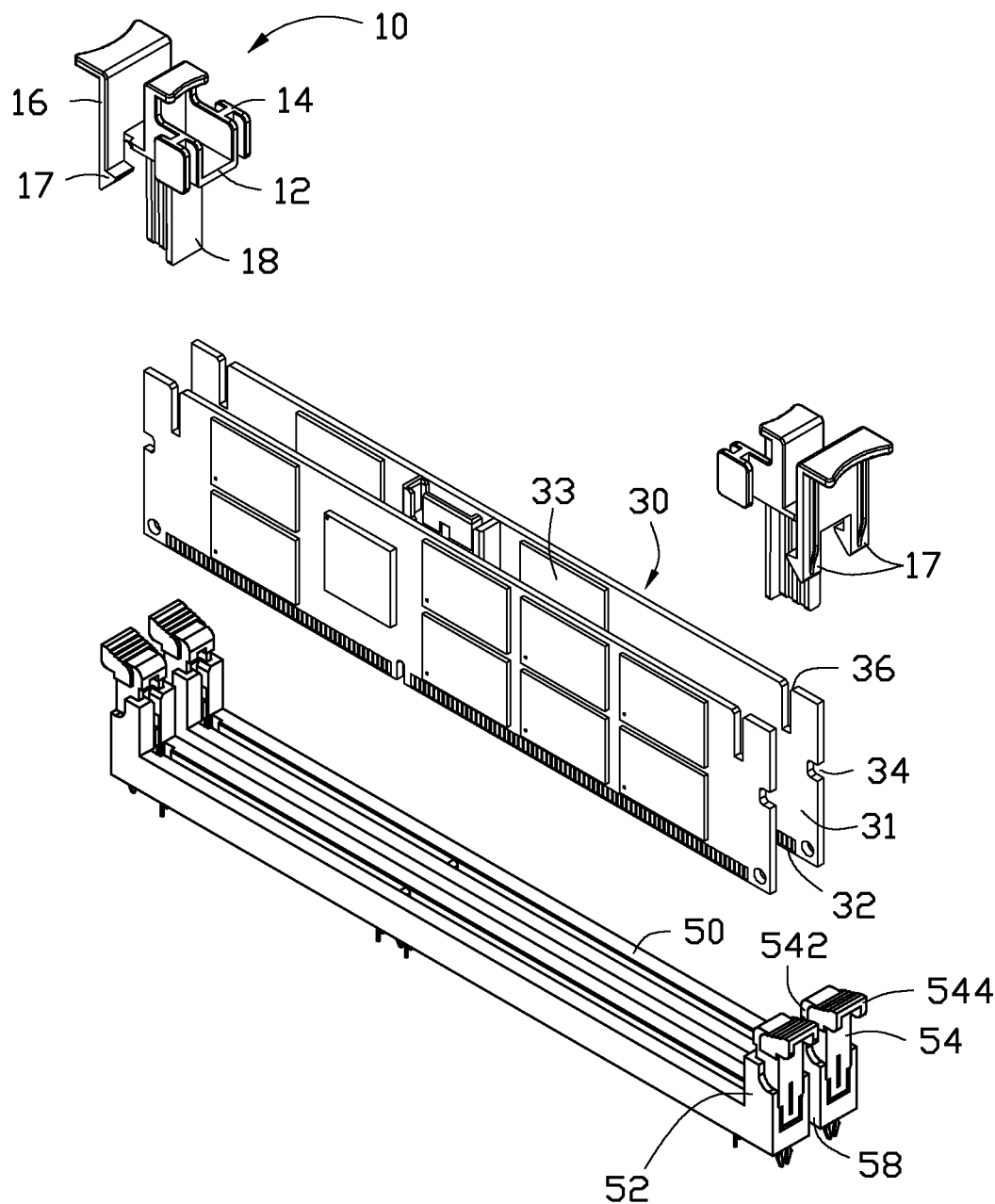
FIG. 1 is an exploded, isometric view of a first exemplary embodiment of a mounting apparatus, together with two expansion cards, wherein the mounting apparatus includes two latching members.

Referring to FIG. 1, a first embodiment of a mounting apparatus is used for mounting two parallel expansion cards 30. The mounting apparatus includes two expansion slots 50, four locking members 54 rotatably mounted to opposite ends of the expansion slots 50, and two latching members 10 to fix the corresponding locking members 54.

The expansion slots 50 are installed on a motherboard (not shown), parallel to each other. A wide space 58 is formed between the expansion slots 50. Each expansion slot 50 includes two fixing portions 52 respectively extending up from the opposite ends of the expansion slot 50. The locking members 54 are rotatably mounted to the corresponding fixing portions 52. Each locking member 54 includes a projection 542 extending from a top of the locking member 54 toward the other locking member 54, and an operation portion 544 extending from the top of the locking member 54 away from the projection 542.

Each expansion card 30 includes an elongated circuit board 31. An edge connector 32 is formed on a bottom side of the circuit board 31, and a plurality of chips 33 mounted on a side surface of the circuit board 31. Two cutouts 34 are defined in two opposite ends of the circuit board 31. Two locating slots 36 are defined in two opposite ends of a top side of the circuit board 31. In the embodiment, the expansion card 30 is a solid state disk card.

Figure 2:
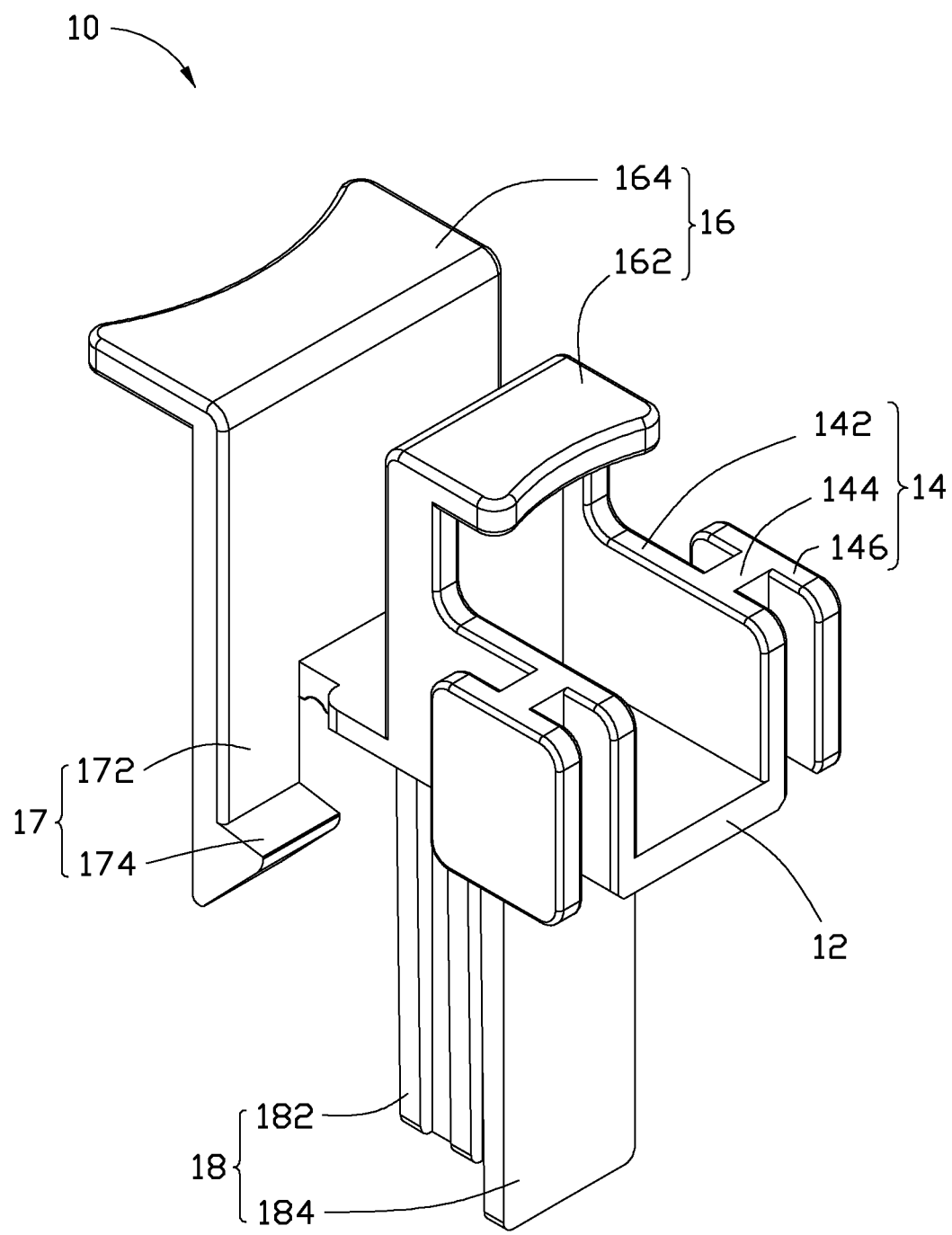
FIG. 2 is an enlarged, isometric view of the latching member of FIG. 1.

Referring to FIG. 2, each latching member 10 includes a rectangular connecting plate 12. Extending up from two opposite sides of a first end of the connecting plate 12 are two substantially H-shaped latching portions 14. Each latching portion 14 includes an extension plate 142 perpendicularly extending up from the connecting plate 12, a stop plate 146 is parallel to the extension plate 142, and a latching plate 144 is perpendicularly connected between the extension plate 142 and the stop plate 146. The distance between the extension plate 142 and the corresponding stop plate 146 of each latching portion 14 is little greater than a width of the expansion card 30. An operation portion 16 is formed from the connecting plate 12.

The operation portion 16 includes a substantially L-shaped first operation plate 162 perpendicularly extending up from a middle of the connecting plate 12, and a substantially L-shaped second operation plate 164 extending up from a second end of the connecting plate 12. Two hooks 17 extend down from a bottom of the second operation plate 172, at two opposite sides of the second end of the connecting plate 12. Each hook 17 includes a resilient extension piece 172 extending from the second operation plate 172, and a wedge-shaped latching block 174 extending from a distal end of the extension piece 172 facing the latching portions 14. Each latching block 174 defines a slanting guiding surface. A substantially T-shaped mounting portion 18 extends down from the middle of the connecting plate 12, and includes a rectangular first engaging plate 182 perpendicularly extending from the connecting plate 12 and parallel to the extension plates 142. In addition, a rectangular second engaging plate 184 is perpendicularly extending from a side of the first engaging plate 182 adjacent to the latching portions 14. In the embodiment, the latching member 10 is made of resilient material, such as plastic, and is integrally formed.

Figure 3:
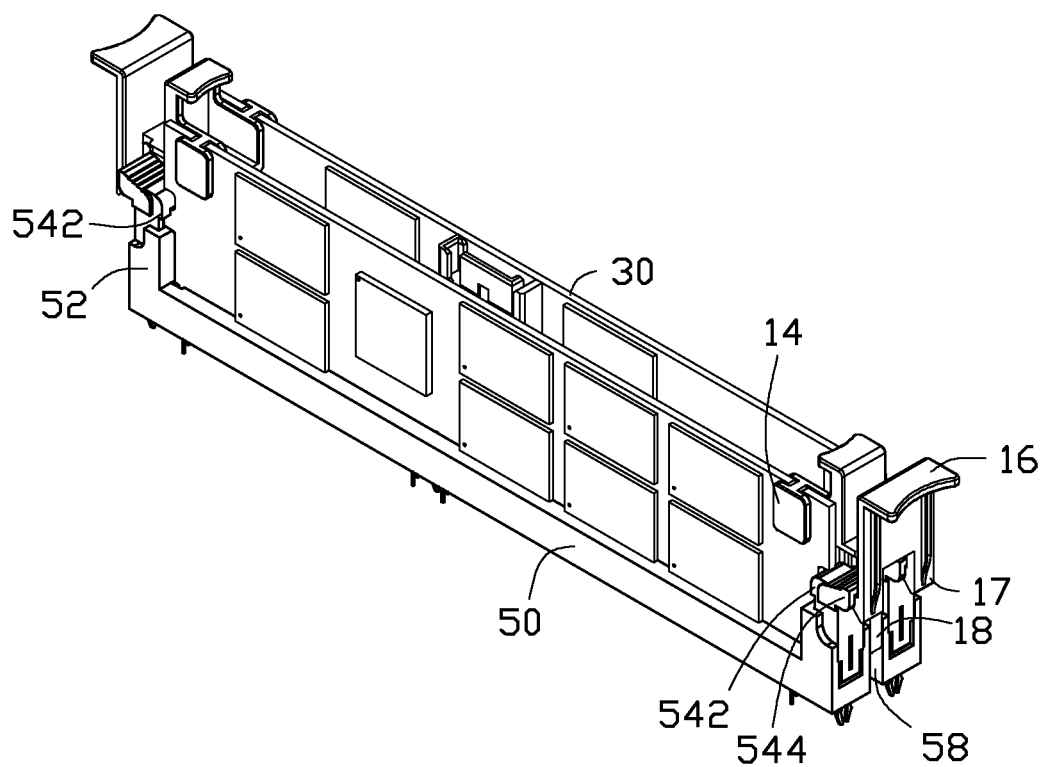
FIG. 3 is an assembled, isometric view of FIG. 1.

Referring to FIGS. 1 and 3, in assembly, the locking members 54 of each expansion slot 50 are rotated away from each other. The edge connectors 32 are respectively inserted into the expansion slots 50. The locking members 54 are rotated back to make the projections 542 latch in the corresponding cutouts 34.

Each latching member 10 is attached to a corresponding end of a corresponding expansion card 30. The mounting portion 18 is placed between the expansion cards 30. The latching plates 144 align with the locating slots 36 of the corresponding circuit board 31. The hooks 17 align with the operation portions 544 of the corresponding locking members 54. The latching member 10 is pressed down. The latching plates 144 are inserted into the corresponding locating slots 36. The guide surface of each hook 17 abuts against the operation portion 544 of the corresponding locking member 54, deforming the extension piece 172 to make the latching block 174 move away from the corresponding locking member 54, until the latching block 174 passes by the corresponding operation portion 544. The extension piece 172 is restored to drive the latching block 174 to latch a bottom surface of the corresponding operation portion 544. The expansion cards 30 are sandwiched between the extension plates 142 and the corresponding stop plates 146. The first engaging plate 182 of each mounting portion 18 is inserted into the space 58. The second engaging plate 184 abuts against an inner side of the corresponding fixing portion 52 opposite to the locking member 54. The locking members 54 are thereby sandwiched between the fixing portions 52 and the latching member 10.

In disassembling the expansion cards 30 from the expansion slots 50, the first and second operation plates 162 and 164 are pressed toward each other. The latching blocks 174 of each latching member 10 are disengaged from the corresponding operation portions 544. The latching members 10 are moved up away from the expansion cards 30. The locking members 50 are rotated out. The projections 542 are disengaged from the corresponding cutouts 34. The expansion cards 30 are ready to be removed from the expansion slots 50.

Figure 4:
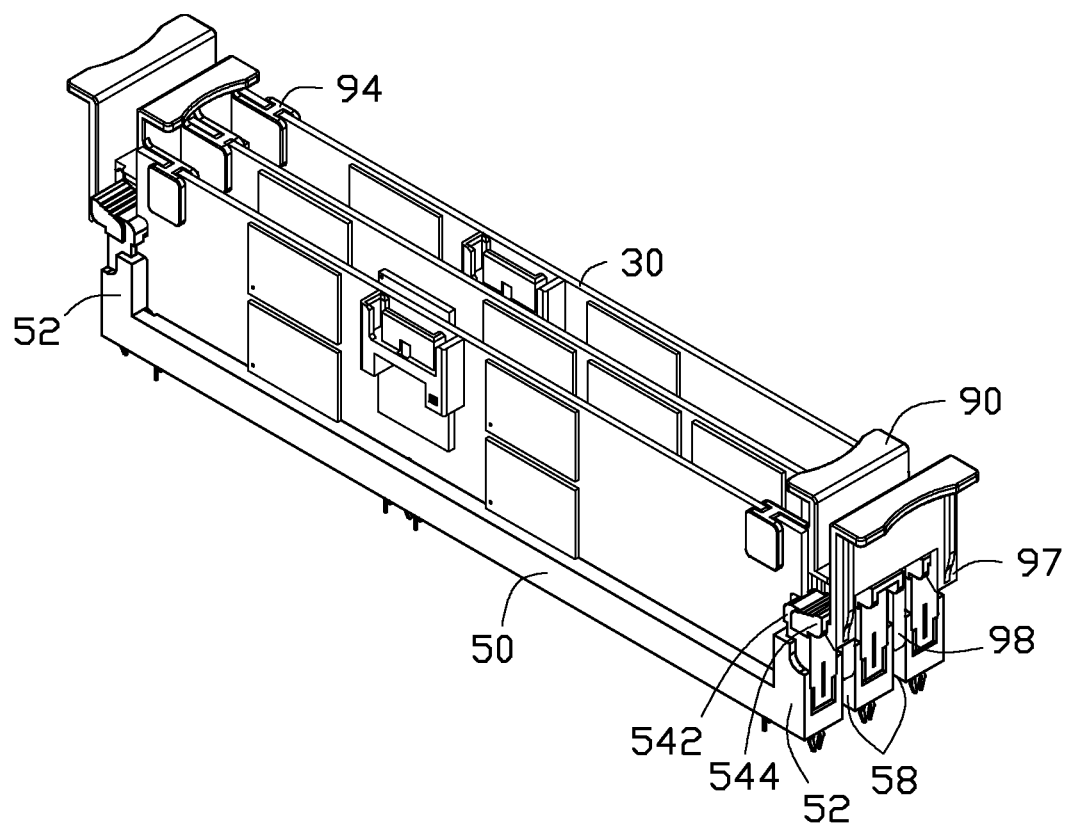
FIG. 4 is an assembled, isometric view of a second exemplary embodiment of a mounting apparatus, together with three expansion cards, wherein the mounting apparatus includes two latching members.
Figure 5:
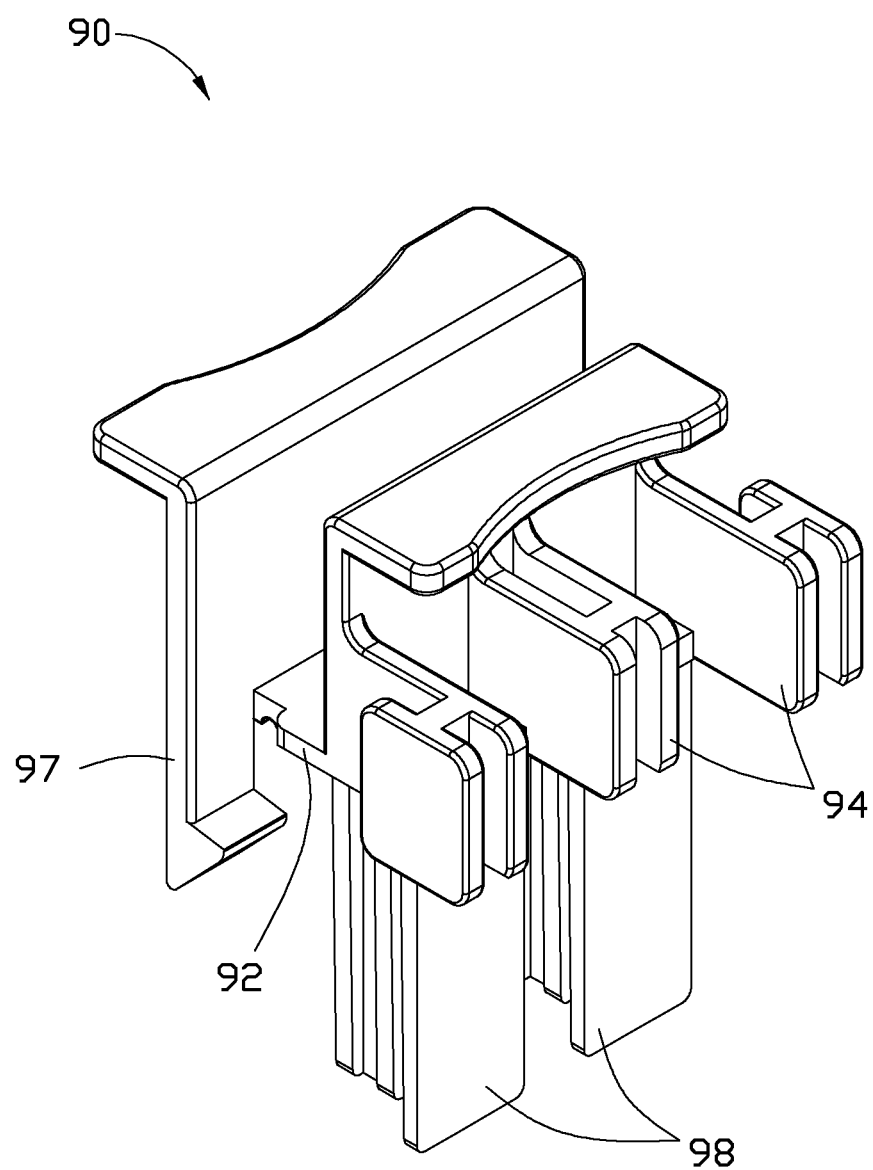
FIG. 5 is an enlarged, isometric view of the latching member of FIG. 4.

Referring to FIGS. 4 and 5, a second embodiment of a mounting apparatus is used for mounting three parallel expansion cards 30. A wide space 58 is formed between every two adjacent expansion cards 30. The second embodiment of the mounting apparatus is substantially similar to the first embodiment of the mounting apparatus, except that two latching members 90 replace the latching members 10 of the first embodiment. Each latching member 90 includes a rectangular connecting plate 92, three latching portions 94 formed on a first end of the connecting plate 92 for latching the expansion cards 30. Two hooks 97 extending down from a second end of the connecting plate 92 for latching the operation portions 544 of the corresponding locking members 54, and two mounting portions 98 extending down from the middle of the connecting plate 92. Each mounting portion 98 is located between two adjacent corresponding latching portions 94. The mounting portions 98 are respectively inserted into the spaces 58 for abutting against the corresponding fixing portions 52.

It is to be understood, however, that even though numerous characteristics and advantages of the embodiments have been set forth in the foregoing description, together with details of the structure and function of the embodiments, the present disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A latching member for latching two expansion cards to two parallel expansion slots, a top of each expansion card defining a locating slot adjacent each of opposing first and second ends thereof and a lower end of each expansion card being received within a respective one of the expansion slots, adjacent pairs of opposing first and second ends of the expansion slots each comprising two adjacent fixing portions having two corresponding locking members respectively connected to the fixing portions, each locking member comprising a projection extending from a top thereof to engage with a corresponding first or second end of a respective one of the expansion cards and an operation portion extending from the top of the locking member away from the projection, the latching member comprising:
   a horizontal connecting plate having parallel front and rear edges parallel to the expansion slots and opposing first and second ends;
   two latching portions extending upwardly from the first end of the connecting plate;
   two resilient hooks extending downwardly from the second end of the connecting plate to latch with the locking members of a respective pair of adjacent first or second ends of the two expansion slots; and
   a mounting portion comprising a rectangular first engaging plate perpendicularly extending downwardly from a middle of the connecting plate perpendicular to the front and rear edges to be received between the expansion slots, and a second engaging plate perpendicularly extending from a side of the first engaging plate facing the hooks to be engaged with inner sides of the fixing portions;
   wherein each latching portion comprises an extension plate extending upwardly from and along a respective one of the front and rear edges of the connecting plate, a stop plate parallel to the extension plate, and a vertical latching plate perpendicularly connected between the extension plate and the stop plate, wherein the latching plates are to be engaged in the locating slots, to fasten the expansion cards toward the expansion slots, and each expansion card is sandwiched between a respective one of the extension plates and a corresponding stop plate;
   wherein each hook comprises a resilient extension piece extending from the connecting plate adjacent a respective one of the front and rear edges, and a latching block extending from a distal end of the extension piece facing the latching portions to latch to a bottom of the operation portion of a respective one of the locking members.

2. The latching member of claim 1, wherein each latching portion is substantially H-shaped.

3. The latching member of claim 1, wherein an operation portion is formed on the second end of the connecting plate, the operation portion comprises a first operation plate extending upwardly from a middle of the connecting plate, and a second operation plate extending upwardly from the second end of the connecting plate, the hooks extending downwardly from the second operation plate and at opposite sides of the second end of the connecting plate.

4. The latching member of claim 1, wherein the latching member is made of plastic.

5. A mounting apparatus for latching two expansion cards, each expansion card defining a locating slot in a top thereof adjacent each of opposing first and second ends of the expansion card, the mounting apparatus comprising:
   two parallel expansion slots each into which an edge connector disposed at a lower end of a respective one of the expansion cards is to be inserted;
   four fixing portions each extending upwardly from a respective one of opposite first and second ends of one of the expansion slots;
   four locking members each rotatably mounted to a corresponding one of the four fixing portions for clamping opposite ends of the two expansion cards, respectively, each locking member comprises a projection extending from a top thereof to engage with a corresponding end of a respective one of the expansion cards and an operation portion extending from the top of the locking member away from the projection; and two latching members, each comprising:

a horizontal connecting plate having parallel front and rear edges parallel to the expansion slots and opposing first and second ends;

two latching portions extending upwardly from the first end of the connecting plate;

two resilient hooks extending downwardly from the second end of the connecting plate to latch with the locking members at the same side of the two expansion slots; and a mounting portion comprising a rectangular first engaging plate perpendicularly extending downwardly from a middle of the connecting plate perpendicular to the front and rear edges to be received between the expansion slots, and a second engaging plate perpendicularly extending from a side of the first engaging plate facing the hooks to be engaged with inner sides of the fixing portions;

wherein each latching portion comprises an extension plate extending upwardly from and along a respective one of the front and rear edges of the connecting plate, a stop plate parallel to the extension plate, and a vertical latching plate perpendicularly connected between the extension plate and the stop plate, wherein the latching plates are to be engaged in the locating slots, to fasten the expansion cards toward the expansion slots, and each expansion card is sandwiched between a respective one of the extension plates and a corresponding stop plate;

wherein each hook comprises a resilient extension piece extending from the connecting plate adjacent a respective one of the front and rear edges, and a latching block extending from a distal end of the extension pieces facing the latching portions, wherein each latching block is latched to a bottom of the operation portion of a respective one of the locking members.

6. The mounting apparatus of claim 5, wherein each latching portion is substantially H-shaped.

7. The mounting apparatus of claim 5, wherein an operation portion is formed on the second end of each connecting plate, the operation portion comprises a first operation plate extending upwardly from a middle of the connecting plate, and a second operation plate extending upwardly from the second end of the connecting plate, the hooks extending downwardly from the second operation plate and at opposite sides of the second end of the connecting plate.

8. The mounting apparatus of claim 5, wherein the latching members are made of plastic.

* * * * *